(12) United States Patent
Itomi

(10) Patent No.: US 7,398,699 B2
(45) Date of Patent: Jul. 15, 2008

(54) ROTATIONAL ANGLE DETECTING SENSOR

(75) Inventor: Shoji Itomi, Kuwana (JP)

(73) Assignee: NTN Corporation, Osaka (JP)

( * ) Notice: Subject to any disclaimer, the term of this patent is extended or adjusted under 35 U.S.C. 154(b) by 32 days.

(21) Appl. No.: 11/603,149

(22) Filed: Nov. 22, 2006

(65) Prior Publication Data

US 2007/0182283 A1    Aug. 9, 2007

(30) Foreign Application Priority Data

Nov. 25, 2005    (JP)    ............................. 2005-340489

(51) Int. Cl.
*G01D 5/165* (2006.01)
(52) U.S. Cl. ...................... 73/862.08; 33/1 N; 33/1 PT
(58) Field of Classification Search .............. 73/862.08; 33/1 N, 1 PT
See application file for complete search history.

(56) References Cited

U.S. PATENT DOCUMENTS

| | | | | |
|---|---|---|---|---|
| 5,007,159 A | * | 4/1991 | Brown et al. ................... | 29/622 |
| 5,657,544 A | * | 8/1997 | Ota et al. ....................... | 33/1 N |
| 6,257,907 B1 | * | 7/2001 | Feichtinger .................. | 439/135 |
| 6,445,278 B1 | * | 9/2002 | Okumura ..................... | 338/162 |
| 6,617,571 B2 | * | 9/2003 | Thaler et al. ............ | 250/231.13 |
| 6,688,006 B2 | * | 2/2004 | Itomi ........................... | 33/1 N |
| 7,308,765 B2 | * | 12/2007 | Riepertinger ................. | 33/1 N |
| 7,316,071 B2 | * | 1/2008 | Harrer ......................... | 33/1 PT |
| 2001/0034943 A1 | * | 11/2001 | Itomi ........................... | 33/1 N |

FOREIGN PATENT DOCUMENTS

JP    2604100    2/2000

* cited by examiner

*Primary Examiner*—Edward Lefkowitz
*Assistant Examiner*—Freddie Kirkland, III
(74) *Attorney, Agent, or Firm*—Wenderoth, Lind & Ponack, L.L.P.

(57) ABSTRACT

A rotational angle detecting sensor has a cylindrical housing including an end wall at a first end thereof. A covering member covers the second open end of the housing. A rotary shaft extends through the end wall of the housing and includes a large-diameter portion having a shoulder surface and rotatably received in the housing. A rotational angle detector is disposed between the inner surface of the covering member and the end surface of the large-diameter portion of the rotary shaft. An actuate groove is formed in the inner surface of the end wall of the housing concentrically with the rotary shaft. A stopper pin is attached to the shoulder surface of the large-diameter portion of the rotary shaft so as to be movable in the groove. The stopper pin abuts against the circumferential ends of the groove, thereby limiting the rotational range of the stopper pin.

1 Claim, 3 Drawing Sheets

Fig.3A        Prior Art
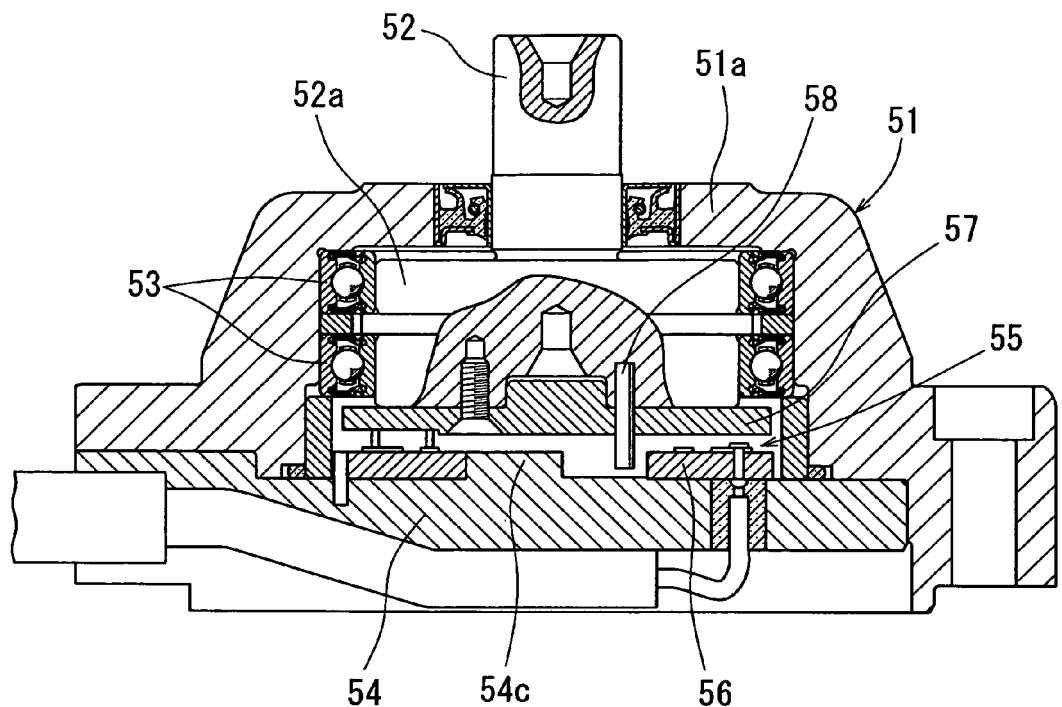
Fig.3B        Prior Art
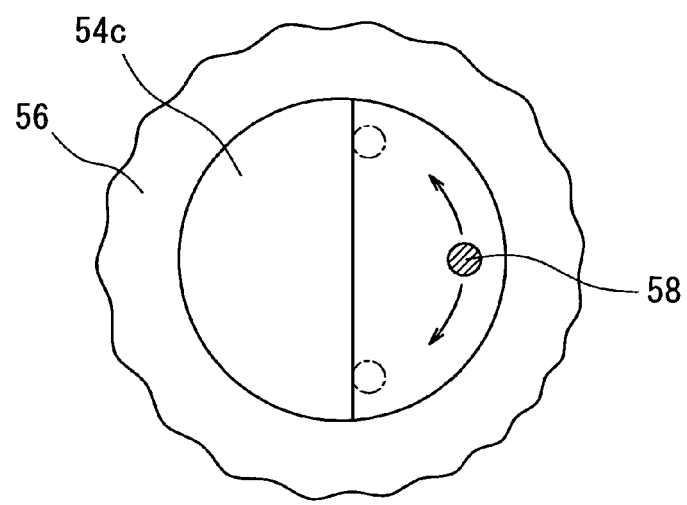

ROTATIONAL ANGLE DETECTING SENSOR

BACKGROUND OF THE INVENTION

The present invention relates to a rotational angle detecting sensor incorporated in construction machines or industrial machines, especially to a sensor to which high loads are applied.

Such rotational angle detecting sensors include ones of which the rotary shaft has one end thereof received in a housing and rotatably supported so that the rotary shaft can rotate with high accuracy (for example, see Japanese utility model publication 2604100).

FIGS. 2A and 2B show such a rotational angle detecting sensor. The rotational angle detecting sensor has a cylindrical housing 51 having an open end and an end wall 51a closing the other end thereof. The sensor further includes a rotary shaft 52 extending through the end wall 51a and having a large-diameter portion 52a at one end thereof. The large-diameter portion is received in the housing 51 and rotatably supported by two ball bearings 53 preloaded in a stationary position. The housing has its open end covered by a covering member 54. A rotational angle detector 55 is disposed between the inner surface of the covering member 54 and the end surface of the large-diameter portion 52a. The rotational angle detector 55 includes a ring-shaped detecting substrate 56 fitted around a circular protrusion 54a formed centrally on the inner surface of the covering member 54, a disc-shaped substrate 57 screwed to the end surface of the large-diameter portion 52a, and a known rotational angle detecting mechanism disposed between the opposed surfaces of the substrates 56 and 57.

As shown in FIG. 2B, an arcuate groove 54b is formed in the circular protrusion 54a of the covering member 54 concentrically with the rotary shaft 52. A stopper pin 58 extends through the substrate 57 and is received in the groove 54b so as to be movable in the groove 54b. The stopper pin 58 is adapted to abut against the ends of the groove 54b, thereby limiting the rotational range of the rotary shaft 52.

Another conventional means for limiting the rotational range of the rotary shaft 52 includes a semicircular protrusion 54c formed on the inner surface of the covering member 54 so that the stopper pin 58 is movable in the space defined between the protrusion 54c and the inner surface of the ring-shaped substrate 56. The movement of the stopper pin 58 is limited by the flat wall of the protrusion 54c.

In these arrangements, if a large force is applied to the stopper pin with the movement of the pin restricted by the protrusion, the pin may be broken into pieces under stress greater than the strength of the pin. The pieces may damage the rotational angle detector. This increases the cost for replacement of the detector.

One way to prevent this problem would be to reduce the distance between the fixed position of the stopper pin and the position where the stopper pin contacts the protrusion, thereby reducing the stress applied to the stopper pin. However, because the stopper pin extends through the detecting substrate and is fixed to the large-diameter portion of the rotary shaft substrate in order to reduce rattling of the substrate, which is screwed to the large-diameter portion of the rotary shaft, its length has to be greater than the thickness of the substrate. Thus, the stress applied to the pin can be reduced only to a certain extent, so that it is impossible to reliably prevent breakage of the stopper pin and thus damage to the rotational angle detector.

If in the arrangement of FIG. 3, it is desired to increase the rotational range of the rotary shaft to more than 180 degrees, the protrusion has to be formed into a fan shape. This makes it difficult to fit the detecting substrate on the protrusion with high positional accuracy, which in turn makes it difficult to detect the rotational angle with high accuracy.

An object of the present invention is to provide a rotational angle detecting sensor of which the rotational detecting angle detector is less likely to be damaged.

SUMMARY OF THE INVENTION

According to the present invention, there is provided a rotational angle detecting sensor comprising a cylindrical housing including an end wall at a first end thereof, a covering member covering a second open end of the housing, a rotary shaft extending through the end wall of the housing and having a large-diameter portion having a shoulder surface and rotatably received in the housing, a rotational angle detector disposed between an inner surface of the covering member and an end surface of the large-diameter portion of the rotary shaft, wherein an arcuate groove is formed in an inner surface of the end wall of the housing concentrically with the rotary shaft and a stopper pin is attached to the shoulder surface of the large-diameter portion of the rotary shaft so as to be movable in the groove, whereby the stopper pin abuts against circumferential ends of the groove, thereby limiting a rotational range of the stopper pin.

More specifically, the stopper pin is attached to the surface of the large-diameter portion of the rotary shaft opposite to the surface to which the rotational angle detector is mounted. With this arrangement, breakage of the pin is less likely to result in damage to the rotational angle detector.

Since the stopper pin is attached to the surface of the large-diameter portion opposite to the surface thereof to which the rotational angle detector is mounted, the rotational angle detector is less likely to be damaged even if the stopper pin breaks. Thus, even if the stopper pin breaks, what is needed is to replace the broken stopper pin only. This reduces repair costs.

By reducing the distance between the shoulder surface of the large-diameter portion of the rotary shaft, to which the stopper pin is mounted, and the inner surface of the end wall of the housing, in which the groove is formed in which the stopper pin is movable, it is possible to reduce the stress applied to the stopper pin when the pin abuts the circumferential ends of the groove, thereby reducing the possibility of breakage of the pin.

BRIEF DESCRIPTION OF THE DRAWINGS

Other features and objects of the present invention will become apparent from the following description made with reference to the accompanying drawings, in which:

FIG. 3A is a vertical sectional front view of another conventional sensor; and

FIG. 3B is a schematic view of the sensor of FIG. 3A, showing the moving range of a stopper pin;

DETAILED DESCRIPTION OF THE PREFERRED EMBODIMENTS

Figure 1A:
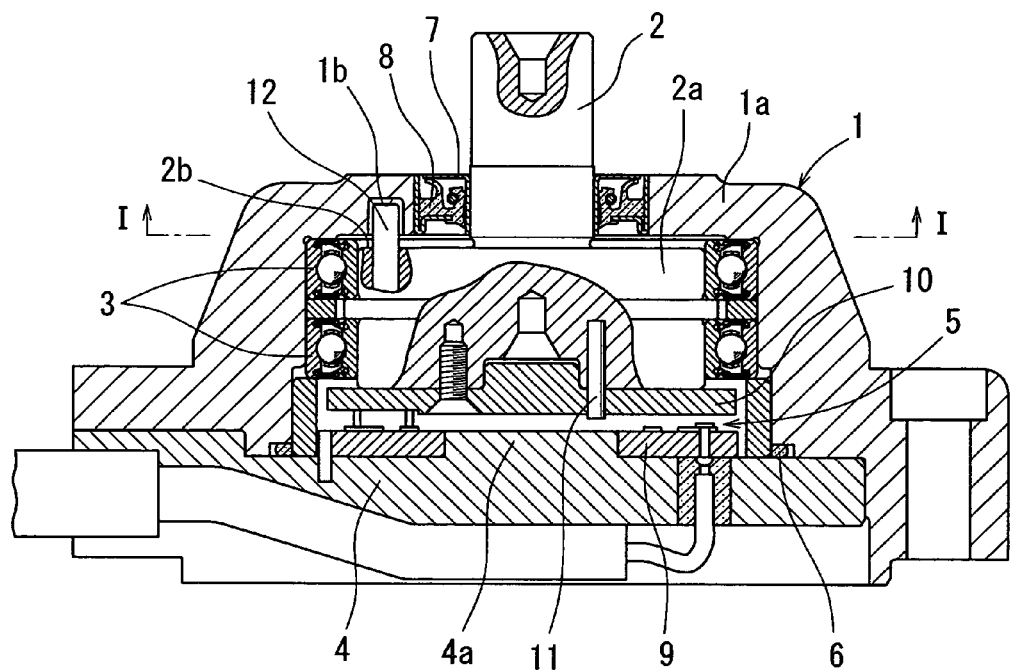
FIG. 1A is a vertical sectional front view of a sensor embodying the present invention.
Figure 1B:
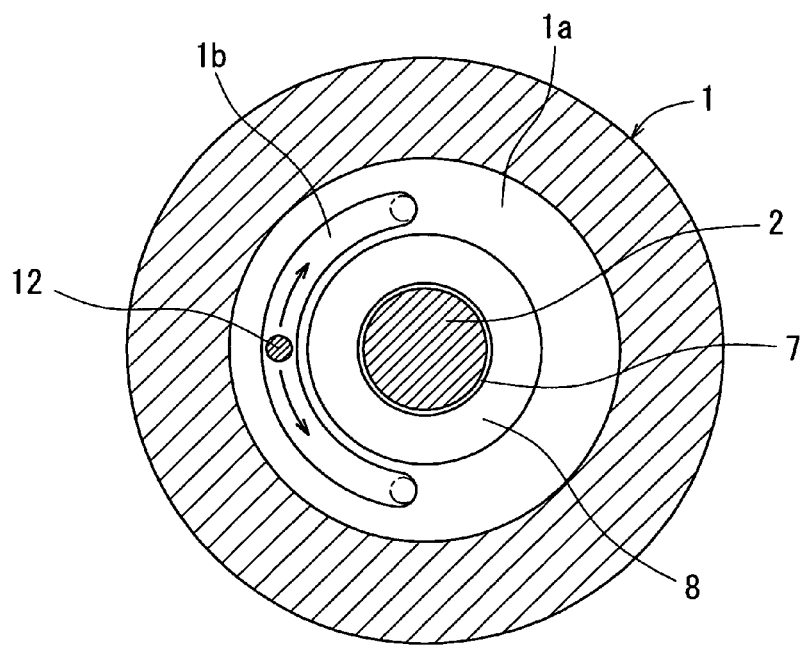
FIG. 1B is a sectional view taken along line I-I of FIG. 1A.
Figure 2A:
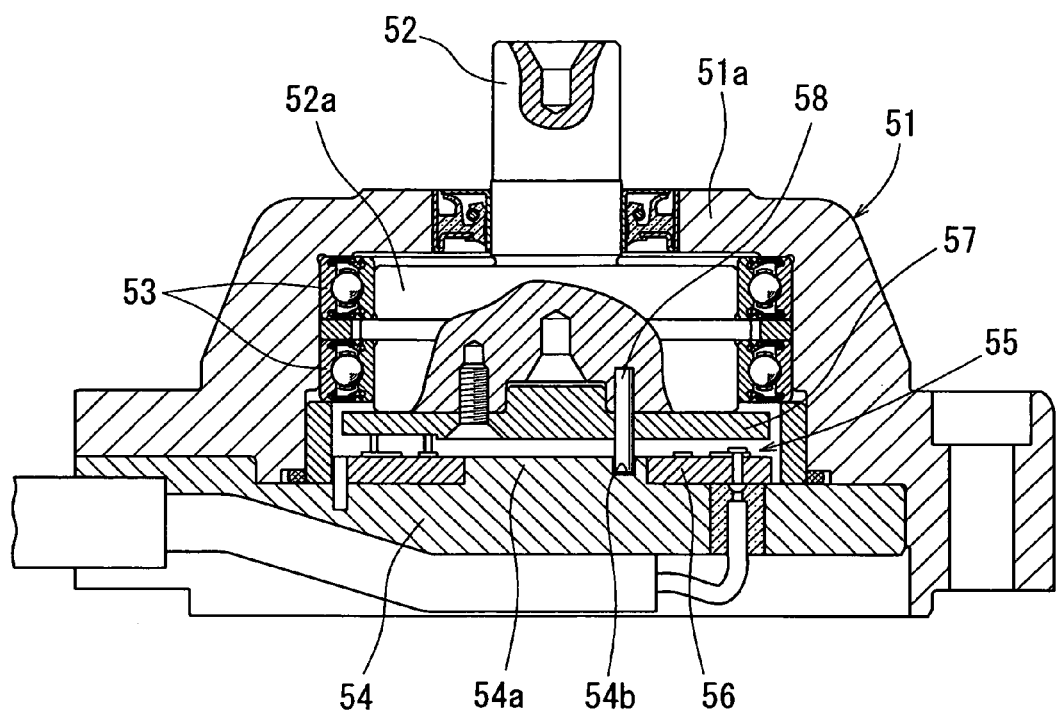
FIG. 2A is a vertical sectional front view of a conventional sensor.
Figure 2B:
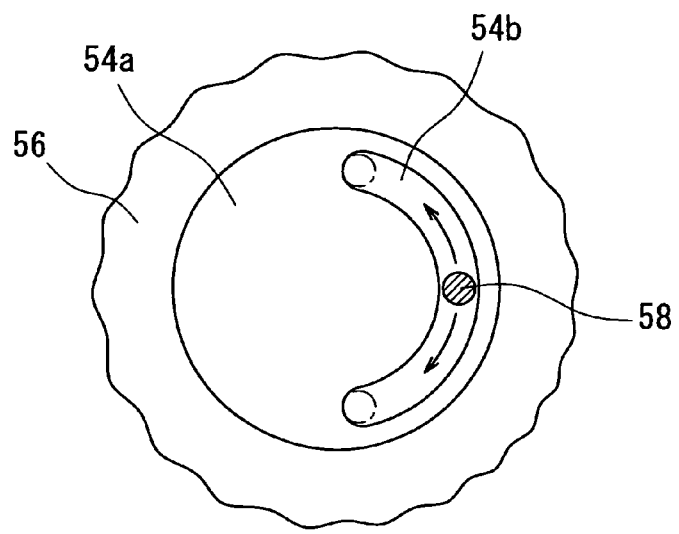
FIG. 2B is a schematic view of the sensor of FIG. 2A, showing the moving range of a stopper pin.

Now referring to the drawings, FIGS. 1A and 1B show a rotational angle detecting sensor embodying this invention. This rotational angle detecting sensor is basically of the same structure as the abovementioned conventional ones. As shown in FIG. 1A, this sensor includes a cylindrical housing 1 having an open end and an end wall 1a closing the other end thereof. The sensor further includes a rotary shaft 2 extending through the end wall 1a and having a large-diameter portion 2a at one end thereof. The large-diameter portion 2a is received in the housing 1 and rotatably supported by two ball bearings 3 preloaded in a stationary position. The housing has its open end covered by a covering member 4. A rotational angle detector 5 is disposed between the inner surface of the covering member 4 and the end surface of the large-diameter portion 2a. A lever (not shown) is fixed to the other end of the rotary shaft 2. The rotary shaft 2 is adapted to rotate via the lever when a machine on which this sensor is mounted is in operation.

The housing 1 is made of a high-strength material for high rotational accuracy of the rotary shaft 2. In order to prevent the entry of dust, the housing 1 is bolted to the covering member 4 with an O ring 6 fitted between the housing 1a and the covering member 4, and further, a lip seal 8 is fitted in a hole in the end wall 1a through which the rotary shaft 2 extends so as to slide on a flanged cylindrical member 7 fixed to the outer periphery of the rotary shaft 2.

The rotational angle detector 5 includes a ring-shaped detecting substrate 9 fitted around a circular protrusion 4a formed centrally on the inner surface of the covering member 4, and a disc-shaped detecting substrate 10 screwed to the end surface of the large-diameter portion 2a so as to face the substrate 9. A known rotational angle detecting mechanism is mounted on the opposed surfaces of the substrates 9 and 10. Such a mechanism may include a circular resistor and a current collector mounted on one of the detecting substrates 9 and 10, and a brush mounted on the other of the detecting substrates 9 and 10. The collector has a predetermined pattern and is kept in contact with the brush. A change in resistance corresponding to the contact position between the collector and the brush is detected as a rotational angle. In order to prevent rattling of the detecting substrate 10 relative to the large-diameter portion 2a, a pin 11 extends through the detecting substrate 10 and is press-fitted into the large-diameter portion 2a.

As shown in FIG. 1B, an arcuate groove 1b is formed in the inner surface of the end wall 1a, concentrically with the rotary shaft 2. A stopper pin 12 is attached to a shoulder surface 2b of the large-diameter portion 2a so as to move in the groove 1b. The stopper pin 12 abuts against the ends of the groove 1a, thereby limiting the rotational range of the rotary shaft 2. Thus, the rotational range of the rotary shaft 2 can be determined by changing the peripheral length of the groove 1b in the end wall 1a. Also, since any change of the rotational range does not affect the positioning accuracy of parts constituting the rotational angle detector 5, a high level of rotational angle detecting accuracy is ensured.

Because the stopper pin 12 for limiting the rotational range of the rotary shaft 2 is attached to the shoulder surface 2b, which is on the opposite side of the large-diameter portion 2 from where the rotational angle detector 5 is located, the rotational angle detector 5 will remain free of damage even if the stopper pin 12 breaks. This reduces repair costs.

Preferably, the distance between the shoulder surface 2b and the inner surface of the end wall 1a is kept sufficiently small so as to reduce stress applied to the stopper pin 12 when the stopper pin 12 abuts against the ends of the groove 1b in the end wall 1a, thereby preventing breakage of the stopper pin 12. More specifically, for a regular-sized sensor having a recess along the edge of the groove 1b, the recess should be about 0.5 mm deep and the distance between the shoulder surface 2b and the bottom of the recess should be not more than 1.5 mm.

What is claimed is:

1. A rotational angle detecting sensor comprising:
   a cylindrical housing including an end wall at a first end thereof;
   a covering member covering a second open end of said housing;
   a rotary shaft extending through said end wall of said housing and having a large-diameter portion having a shoulder surface and rotatably received in said housing;
   a rotational angle detector disposed between an inner surface of said covering member and an end surface of said large-diameter portion of said rotary shaft, wherein an arcuate groove is formed in an inner surface of said end wall of said housing concentrically with said rotary shaft; and
   a stopper pin attached to said shoulder surface of said large-diameter portion of said rotary shaft so as to be movable in said groove;
   whereby said stopper pin abuts against circumferential ends of said groove, thereby limiting a rotational range of said stopper pin.

* * * * *